United States Patent [19]

Frater et al.

[11] Patent Number: 5,570,261
[45] Date of Patent: Oct. 29, 1996

[54] TRANSDUCER SUSPENSION SYSTEM

[75] Inventors: Norman K. Frater, San Jose; Alan P. Giorgi, Cupertino; Oscar J. Ruiz, San Jose, all of Calif.

[73] Assignee: International Business Machines Corporation, Armonk, N.Y.

[21] Appl. No.: 546,518

[22] Filed: Oct. 20, 1995

Related U.S. Application Data

[63] Continuation of Ser. No. 296,613, Aug. 25, 1994, abandoned, which is a continuation of Ser. No. 122,879, Sep. 16, 1993, abandoned.

[51] Int. Cl.$^6$ .............................. G11B 5/48; G11B 21/16
[52] U.S. Cl. ................................................. 360/104
[58] Field of Search ............................... 360/103, 104; 369/244

[56] References Cited

U.S. PATENT DOCUMENTS

| | | | |
|---|---|---|---|
| 3,931,641 | 1/1976 | Watrous | 360/103 |
| 4,167,765 | 9/1979 | Watrous | 360/103 |
| 4,449,155 | 5/1984 | Meier et al. | 360/104 |
| 4,724,500 | 2/1988 | Dalziel | 360/104 |
| 4,797,763 | 1/1989 | Levy et al. | 360/104 |
| 4,807,054 | 2/1989 | Sorensen et al. | 360/103 |
| 4,853,811 | 8/1989 | Brooks, Jr. et al. | 360/103 |
| 4,868,694 | 9/1989 | Hagen | 360/104 |
| 4,884,154 | 11/1989 | Onodera et al. | 360/104 |
| 4,937,693 | 6/1990 | Connolly et al. | 360/106 |
| 4,991,045 | 2/1991 | Oberg | 360/104 |
| 4,992,898 | 2/1991 | Wanlass | 360/104 |
| 4,996,616 | 2/1991 | Aoyagi et al. | 360/104 |
| 4,996,623 | 2/1991 | Erpelding et al. | 360/104 |
| 5,001,583 | 3/1991 | Matsuzaki | 360/104 |
| 5,003,420 | 3/1991 | Hinlein | 360/104 |
| 5,012,368 | 4/1991 | Bosier et al. | 360/104 |
| 5,063,464 | 11/1991 | Astheimer et al. | 360/104 |
| 5,074,029 | 12/1991 | Brooks, Jr. et al. | 29/603 |
| 5,079,660 | 1/1992 | Yumura et al. | 360/104 |
| 5,138,507 | 8/1992 | Zarouri et al. | 360/104 |
| 5,172,286 | 12/1992 | Jurgenson | 360/104 |
| 5,198,945 | 3/1993 | Blaeser et al. | 360/104 |
| 5,208,712 | 5/1993 | Hatch et al. | 360/98.01 |
| 5,237,472 | 8/1993 | Morehouse et al. | 360/105 |

FOREIGN PATENT DOCUMENTS

| | | | |
|---|---|---|---|
| 0155746 | 9/1985 | European Pat. Off. | 360/104 |
| 0428289A2 | 10/1990 | European Pat. Off. . | |
| 442225 | 12/1990 | European Pat. Off. . | |
| 484906 | 6/1991 | European Pat. Off. . | |
| 59-207065 | 11/1984 | Japan | 360/103 |
| 61-63974 | 4/1986 | Japan | 369/244 |
| 63-261584 | 10/1988 | Japan | 360/104 |
| 63-281282 | 11/1988 | Japan | 360/104 |
| 1213821 | 8/1989 | Japan . | |
| 2193833 | 8/1986 | United Kingdom . | |
| 9205542 | 4/1992 | WIPO | 360/104 |
| 92/09076 | 5/1992 | WIPO . | |
| 92/20066 | 11/1992 | WIPO . | |
| 9220066 | 11/1992 | WIPO | 360/104 |

OTHER PUBLICATIONS

IBM TDB vol. 33 No. 10B Mar. 1991"Rework Feature For an Actuator Assembly" W. W. Brooks Jr. et al.
IBM TDB vol. 32 No. 3A Aug. 1989 "Integrated Head Suspension Assembly" A. Aoyagi et al.
IBM TDB vol. 31 No. 12 May 1989 "Integrated Arm–Head Suspension for Magnetic Disk Files" E. H. Elser et al.

*Primary Examiner*—Stuart S. Levy
*Assistant Examiner*—William J. Klimowicz
*Attorney, Agent, or Firm*—Douglas R. Millett

[57] ABSTRACT

A suspension system comprises a load beam connecting a transducer element to a support member. The load beam has a stiffener member which forms an enclosed interior chamber. The stiffener member adds rigidity to the suspension. The transducer element is connected to the load beam by a pivoting assembly. The pivoting assembly is comprised of a plurality of thin plate members which are stacked together. The result is a low profile suspension system.

56 Claims, 13 Drawing Sheets

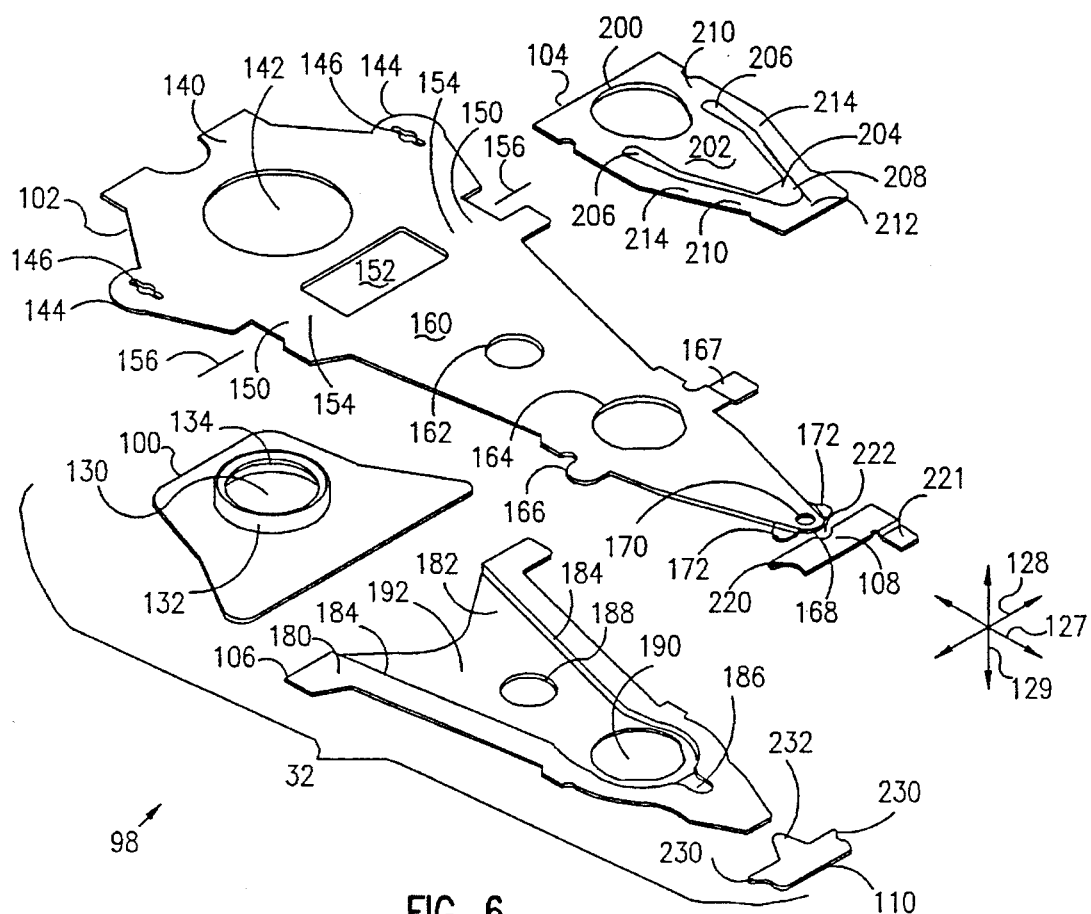
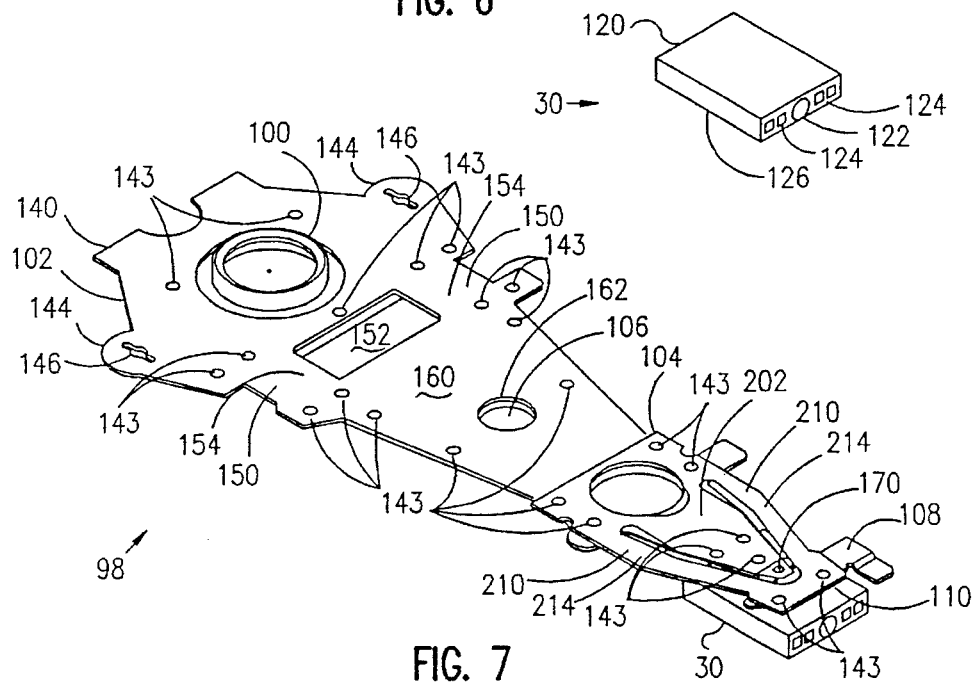

TRANSDUCER SUSPENSION SYSTEM

This is a continuation of application Ser. No. 08/296,613 filed Aug. 25, 1994, now abandoned, which is a continuation of application Ser. No. 08/122,879 filed Sep. 16, 1993, now abandoned.

BACKGROUND OF THE INVENTION

1. Field of the Invention

This invention relates generally to transducer suspension systems and more particularly to a suspension system having a low profile.

2. Description of the Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some recently proposed disk drives, the slider (or carrier) rides on a liquid film or bearing on the disk. A suspension assembly connects the slider to a rotary or linear actuator. The suspension provides support for the slider.

The suspension must meet several requirements. The suspension must be flexible and provide a bias force in the vertical direction. This is necessary to provide a compensating force to the lifting force of the air bearing in order to keep the slider at the correct height above the disk. Also, the vertical flexibility is needed to allow the slider to be loaded and unloaded away from the disk. Another requirement of the suspension is that it must provide a pivotal connection for the slider. Irregularities in manufacture and operation may result in misalignment of the slider. The slider is able to compensate for these problems by pitching and/or rolling slightly to maintain the air bearing. Another requirement of the suspension is that it must be rigid in the lateral direction. This is needed to prevent the head from moving side to side, which would result in the head reading the wrong track.

Present suspension systems have problems in achieving low enough pitch and roll stiffness for the air bearing flying height tolerances while at the same time achieving high enough lateral stiffness to prevent relative motion between the slider and the supporting end of the suspension.

Another requirement of suspensions is that they have a radial frequency response that satisfies the requirements of the disk drive system. A desirable radial frequency response consists of resonances high in frequency and low in gain. The present suspension systems typically use flanged load beams which exhibit undesirable low frequency bending, torsion, and sway modes. This is especially true where the flange height of the suspension is relatively small.

Examples of suspension systems are shown in the following references:

U.S. Pat. No. 5,208,712, issued May 4, 1992; U.S. Pat. No. 5,172,286, issued Dec. 15, 1992; U.S. Pat. No. 5,138,507, issued Aug. 11, 1992; U.S. Pat. No. 5,074,029, issued Dec. 24, 1991; U.S. Pat. No. 5,063,464, issued Nov. 5, 1991; U.S. Pat. No. 5,012,368, issued Apr. 30, 1991; U.S. Pat. No. 5,003,420, issued Mar. 26, 1991; U.S. Pat. No. 5,001,583, issued Mar. 19, 1991; U.S. Pat. No. 4,996,623, issued Feb. 26, 1991; U.S. Pat. No. 4,996,616, issued Feb. 26, 1991; U.S. Pat. No. 4,991,045, issued Feb. 5, 1991; U.S. Pat. No. 4,937,693, issued Jun. 26, 1990; U.S. Pat. 4,853,811, issued Aug. 1, 1989; U.S. Pat. No. 4,884,154, issued Nov. 28, 1989; U.S. Pat. No. 4,868,694, issued Sep. 19, 1989; U.S. Pat. No. 4,807,054, issued Feb. 21, 1989; U.S. Pat. No. 4,167,765, issued Sep. 11, 1979; U.S. Pat. No. 3,931,641, issued Jan. 6, 1976; European Patent Application 484,906, published May 13, 1992; European Patent Application 442,225, published Aug. 21, 1991; Japanese Patent Application 01-213821, published Aug. 28, 1989; UK Patent Application 2,193,833, published Feb. 17, 1988; IBM Technical Disclosure Bulletin Vol. 33, No. 10B, March 1991, page 392; IBM Technical Disclosure Bulletin Vol. 32, No. 3A, August 1989, page 175; and IBM Technical Disclosure Bulletin Vol. 31, No. 12, May 1989, page 203.

Disk drives have become smaller in size while at the same time the data storage capacity has greatly increased. Large capacity disk drives typically have multiple disks mounted on the same rotatable spindle. In order to accommodate more disks in the same height, the space between each disk must be greatly decreased. Also, disk drives having only a single disk may have limited space to accommodate a suspension between the disk and an outer housing. The height of the suspension has proven to be a limiting factor in realizing closer disk spacing and smaller disk drives. What is needed is a suspension system having a very low profile which still meets the performance requirements.

SUMMARY OF THE INVENTION

Briefly, in a preferred embodiment of the present invention, a suspension system comprises a load beam to which a stiffener member is attached. The stiffener member and the load beam enclose an interior chamber. A first end of the load beam is attached to an actuator arm. The load beam has a spring section located between the actuator arm and the stiffener member.

A flexure member is attached to the second end of the load beam. The flexure member has a pair of leg sections which extend to a tab section. A spacer member is attached to the tab section of the flexure member. A slider plate member is attached to the spacer member. A slider having a transducer is attached to the slider plate member. The second end of the load beam has a dimple which provides a point contact with the slider plate member such that the slider may pivot.

For a fuller understanding of the nature and advantages of the present invention, reference should be made to the following detailed description taken in conjunction with the accompanying drawings.

BRIEF DESCRIPTION OF THE DRAWINGS

FIG. 6 is an exploded view of a suspension system of the present invention;

FIG. 7 is a perspective view of the suspension system of FIG. 6;

DESCRIPTION OF THE PREFERRED EMBODIMENTS

Figure 1:
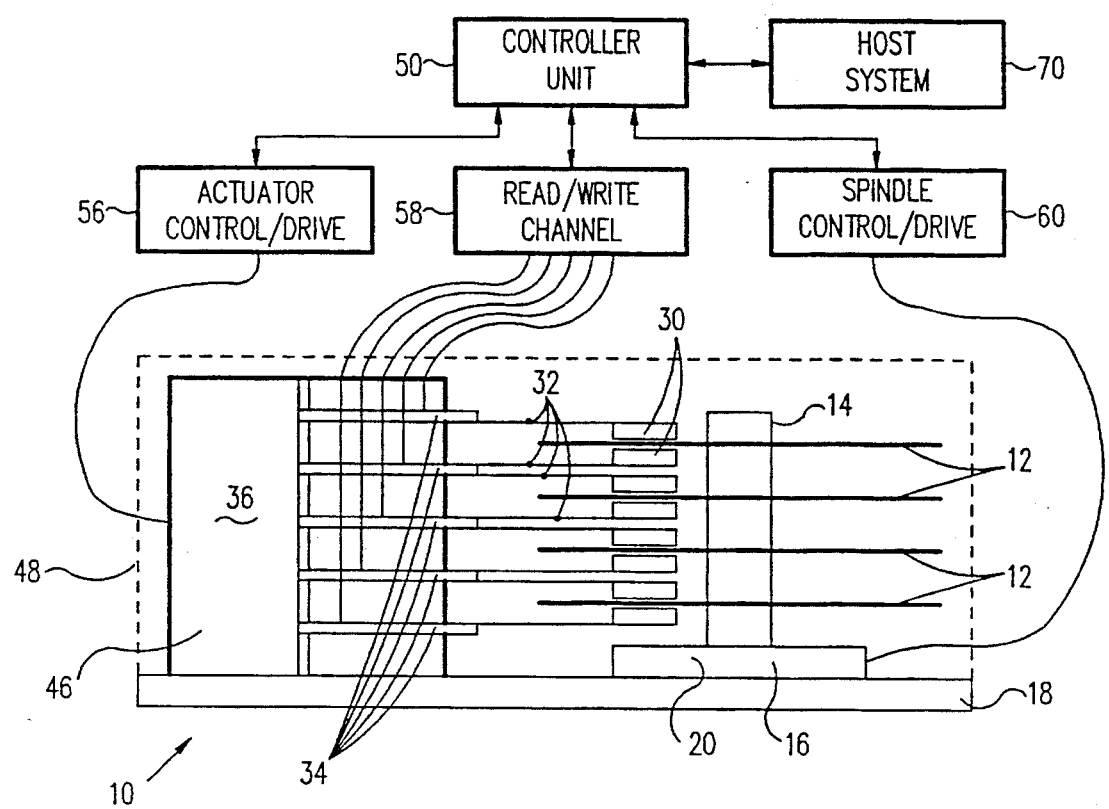
FIG. 1 is a schematic diagram of a data storage system of the present invention.

FIG. 1 shows a schematic diagram of a data storage system of the present invention and is designated by the general reference number 10. System 10 comprises a plurality of magnetic recording disks 12. Each disk 12 has a plurality of concentric data tracks. Disks 12 are mounted on a spindle shaft 14 which is connected to a spindle motor 16. Motor 16 is mounted to a chassis 18. The disks 12, spindle 14, and motor 16 comprise a disk stack assembly 20.

A plurality of read/write heads 30 are positioned over the disks 12 such that each surface of the disks 12 have a corresponding head 30. Each head 30 is attached to one of a plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. The heads 30, suspensions 32, arms 34, and actuator 36 comprise an actuator assembly 46. The disk stack assembly 20 and the actuator assembly 46 are sealed in an enclosure 48 (shown by dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored on disks 12, or may request that digital data be read from the disks 12 and sent to the system 70. The basic operation of DASD units is well known in the art and is described in more detail in *Magnetic Recording Handbook*, C. Dennis Mee and Eric D. Daniel, McGraw-Hill Book Company, 1990.

Figure 2:
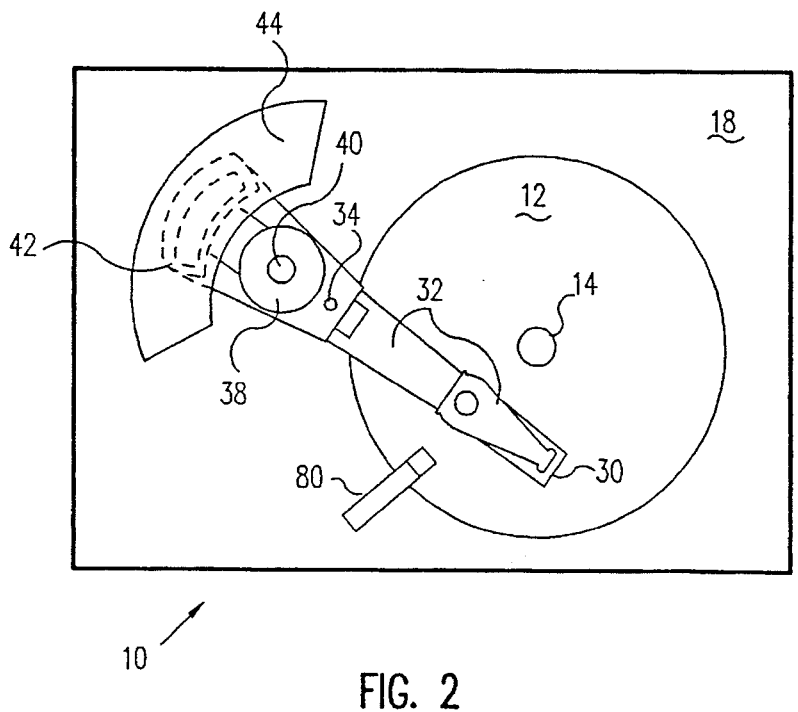
FIG. 2 is a top view of the system of FIG. 1.

FIG. 2 shows a top view of system 10. A loading ramp member 80 is located at the edge of the disks stack assembly 20. Member 80 automatically unloads the heads 30 from the disks 12 as actuator 36 moves the heads 30 to the outer disk position. The ramp 80 is optional. Alternatively, the heads 30 may be placed permanently in the loaded position between the disks.

Figure 3:
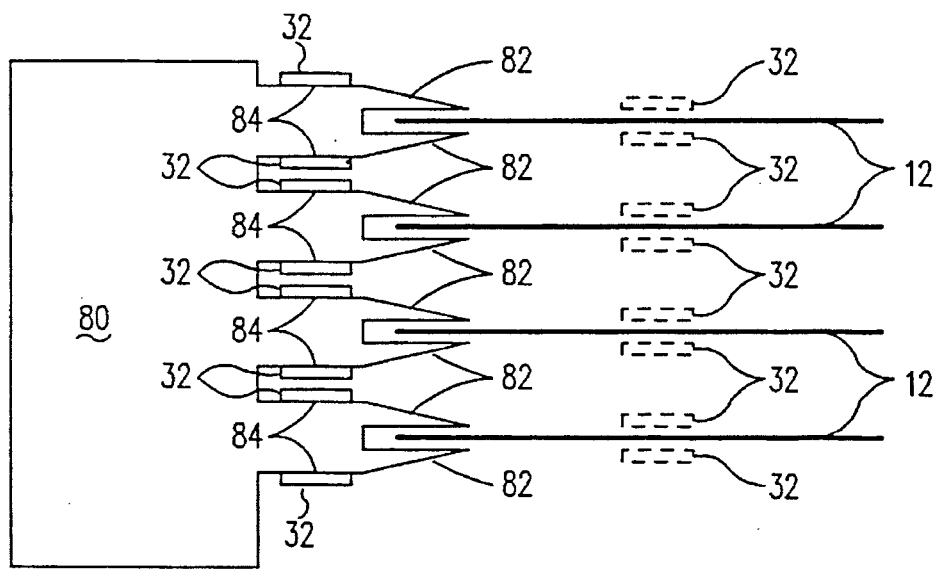
FIG. 3 is a side view of a portion of the system of FIG. 2.

FIG. 3 shows a side view of the ramp member 80. The suspensions 32 are shown in cross section. Member 80 has a plurality of ramp surfaces 82 and ledge surfaces 84. The suspensions 32 shown by a solid line are in the unloaded position on ledges 84. The suspensions shown by a dashed line are in the loaded position, with each one located over one of the surfaces of the disks 12.

Figure 4:
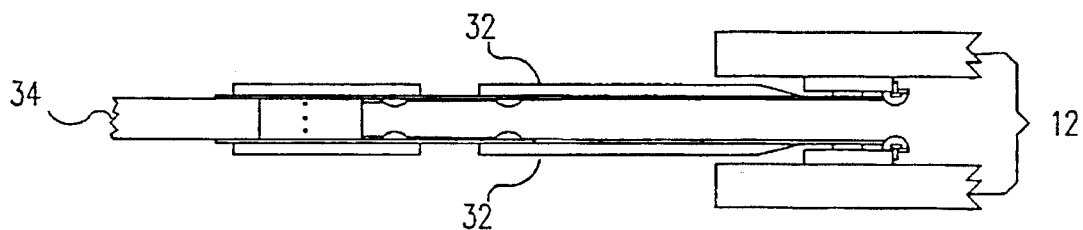
FIG. 4 is a side view of the suspension system of the present invention in a loaded position.

FIG. 4 shows a side view of suspensions 32 in a loaded position over disks 12.

Figure 5:
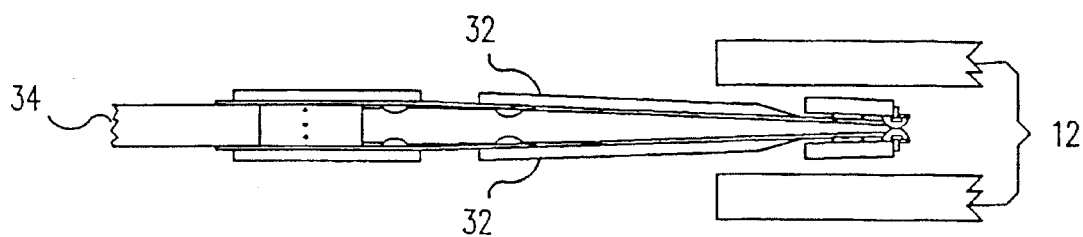
FIG. 5 is a side view of the suspension system of the present invention in an unloaded position.

FIG. 5 shows a side view of suspensions 32 in an unloaded position away from disks 12.

FIG. 6 shows an exploded view of head 30 and suspension 32. This combination is known as the head/suspension assembly and is referred to by the general reference number 98.

FIG. 7 shows a perspective view of the completed assembly 98.

Suspension 32 comprises an arm mounting block 100, a load beam 102, a flexure member 104, a stiffener member 106, a spacer member 108, and a slider plate member 110. Head 30 comprises an air bearing slider 120 having a magnetic read/write transducer element 122. A plurality of electrical pads 124 are electrically connected to the element 122. The slider 120 has an air bearing surface 126.

A plurality of axes 127, 128, and 129 represent longitudinal, latitudinal, and vertical directions, respectively.

Mounting block 100 is made of a rigid material, such as stainless steel, which is able to resist deflection. Mounting block 100 may be of a thickness in range of 0.1 to 0.3 mm and is 0.2 mm thick in a preferred embodiment. Mounting block 100 has a swage aperture 130 which is surrounded by swage flange 132. Flange 132 has a swage lip 134. After the manufacture of the assemblies 98, they are attached to the actuator arms 34 by swaging. Alternatively, the mount block 100 may be omitted and the load beam 102 attached directly to the arm 34 by welding or other appropriate connection.

Load beam 102 is made of a thin rigid material, such as stainless steel, and is of a thickness in the range of 0.025 to 0.075 mm, and preferably 0.05 mm. The beam 102 is substantially triangular in shape. Beam 102 has a mounting section 140 having a swage aperture 142 which is sized to receive the swage flange 132 of mounting block 100. The bottom surface of beam 102 is attached to mounting block 100 by suitable means such as spot welding. Spot welding locations for the suspension 32 are designated by the reference member 143.

Beam 102 has a pair of wing tabs 144 which extend over the edge of the underlying mounting block 100. Tabs 144 each have an aperture 146. Aperture 146 may be used in wire mounting process as described in U.S. Pat. No. 5,074,029.

Beam 102 has a spring section 150 located forward of the mounting section 140. Spring section 150 has a rectangular spring aperture 152 which is flanked by two spring legs 154. Beam 102 has a rigid section 160 located forward of the spring section 150. The spring legs 154 allow the rigid section 160 to bend about an axis 156 such that the head 30 moves up or down. The spring coefficient may be varied as desired by increasing or decreasing the size of the aperture 152 or eliminating aperture 152 entirely.

The vertical stiffness ($K_v$) of the load beam is given by the following relationship:

$$K_v = \frac{1}{12} E t_1^3 \left[ \frac{w}{e} \times \frac{1}{F^2} \right] ;$$

where, $K_v$=Vertical stiffness;

E=Steel elastic modulus;

$t_1$=Load beam thickness;

w=Summation of the widths of both spring legs 154;

e=Length of spring legs 154; and

F=Length from the middle of the spring legs 154 to the load dimple 170.

In the preferred embodiment the spring legs 154 are each 1.4 mm wide with an aperture width of 2.6 mm and which gives a vertical stiffness of 2.1 grams/mm.

Rigid section 160 has an aperture 162 and a tooling aperture 164. A finger tab 166 and a wiring tab 167 extend from the sides of beam 102 near aperture 164. The finger tab 166 is used to align the beam 102 during the assembly process. The forward end of rigid section 160 narrows to a tip 168. Tip 168 has a load dimple 170. The dimple 170 faces in a downward direction and is formed by a stamping process. The distance from the center of aperture 142 to the dimple 170 may be in the range of 12–20 mm and preferably 14.65 mm. A pair of capture tabs 172 extend from the side of section 160 proximate the tip 168. The captured tabs are bent to a lower elevation than the rest of the beam 102 and are stamped or etched thinner than the rest of the load beam material to a preferred thickness of 0.03 mm. Other than the tabs 167 and 172 and the dimple 170, the load beam 160 is flat and not deformed.

The stiffener member 106 is made of a thin rigid material, such as stainless steel, and is of a thickness in the range of 0.025 mm to 0.05 mm, and preferably 0.033 mm. The stiffener member 106 is substantially triangular in shape and corresponds generally to the rigid section 160 of beam 102. The member 106 has a top ledge section 180, a bottom section 182, a pair of side walls 184, and a front wall 186. Side walls 184 are substantially perpendicular to bottom section 182. Front wall 186 preferably slopes at a gradual angle upward from bottom section 182 to top ledge 180. Alternatively, front wall 186 may also be substantially perpendicular to bottom section 182 or may be deleted altogether. The stiffener member 106 has an aperture 188 and a tooling aperture 190 which correspond to apertures 162 and 164, respectively, of beam 102. The stiffener member features 182, 184 and 186 are formed by a stamping process. The stiffener member 106 is attached to the bottom surface of beam 102 by spot welding top ledge section 180 to rigid section 160 of beam 102. The stiffener member 106 does not cover the spring section 150 nor does it cover the tip 168, including dimple 170 and capture tabs 172. In the preferred embodiment, the stiffener member extends from the end of the spring section 150 to a point proximate the tip 168.

When stiffener member 106 is attached to beam 102 an interior chamber 192 is formed there between. The interior chamber is completely enclosed along a cross sectional plane along the latitudinal 128 and vertical 129 directions.

The combination of the load beam 102 and stiffener member 106 creates a light weight but very rigid section. This is accomplished without adding significantly to the overall profile height of the assembly 98. The side walls 184 need only be of a very small height to achieve the desired rigid structure. In a preferred embodiment, the side walls are of a height in the range of 0.1 mm to 0.3 mm and preferably 0.2 mm.

Figure 8:
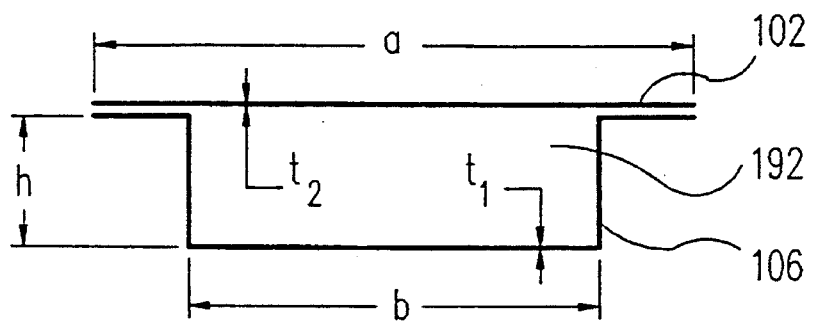
FIG. 8 is a schematic diagram of a cross section of the suspension of the present invention.

FIG. 8 shows a cross-sectional view of the load beam 102 and member 106 (box structure). For this structure the bending stiffness ($K_B$) and torsional stiffness ($K_T$) are given by the following equations:

$$K_B = \frac{1}{12} E a t^3 [2 + 6\gamma^2\beta(2 - \beta) + 2(\delta)\gamma^3(1 - 3(1 + 2\beta)^2)]$$

$$K_T = \frac{G a t^3}{3} \left[ \frac{3(1 + \beta(1 + 2\gamma)^2)}{1 + \beta + 2(1 + \gamma)\delta} + 1 - \beta \right]$$

where,

E = Steel elastic modulus;
G = Steel shear modulus;

$$t = \frac{t_1 + t_2}{2}$$

$$\gamma = \frac{h}{t} ;$$

$$\beta = \frac{b}{a} ;$$

$$\delta = \frac{t}{a} .$$

Figure 9:
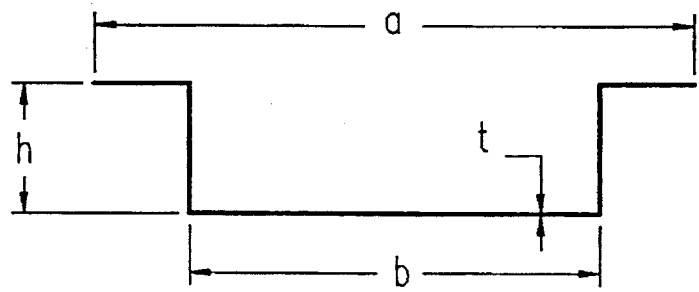
FIG. 9 is a schematic diagram of a cross section of a prior art suspension.

FIG. 9 shows an open suspension structure for sake of comparison with the box structure of the present invention. For the open structure the bending stiffness ($K_B$) and torsional stiffness ($K_T$) are given by the following equations:

$$K_B = \frac{E}{12} a t^3 [1 + 12\gamma^2\beta(1 - \beta) + 2\delta\gamma^3(1 + 3(1 - 2\beta)^2)]$$

$$K_T = G \frac{a t^3}{12} (1 + 2\gamma\delta)$$

Figure 10:
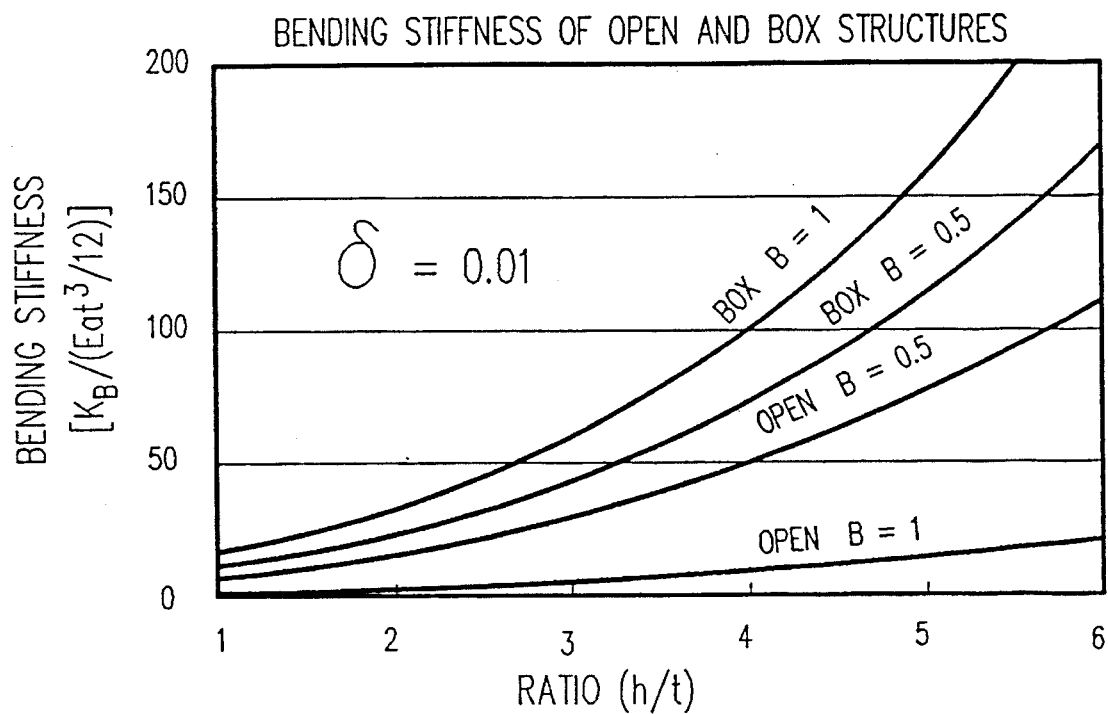
FIG. 10 is a graph of bending rigidity versus the ratio (h/t)

FIG. 10 shows a graph of bending stiffness vs. (h/t) for two versions of the box structure ($\beta$=0.5 and 1) and two versions of the open structure ($\beta$=0.5 and 1). The units of stiffness have been normalized. It can be seen that the box structure has from 1.5 to 10 times better stiffness than an open structure of similar size.

Figure 11:
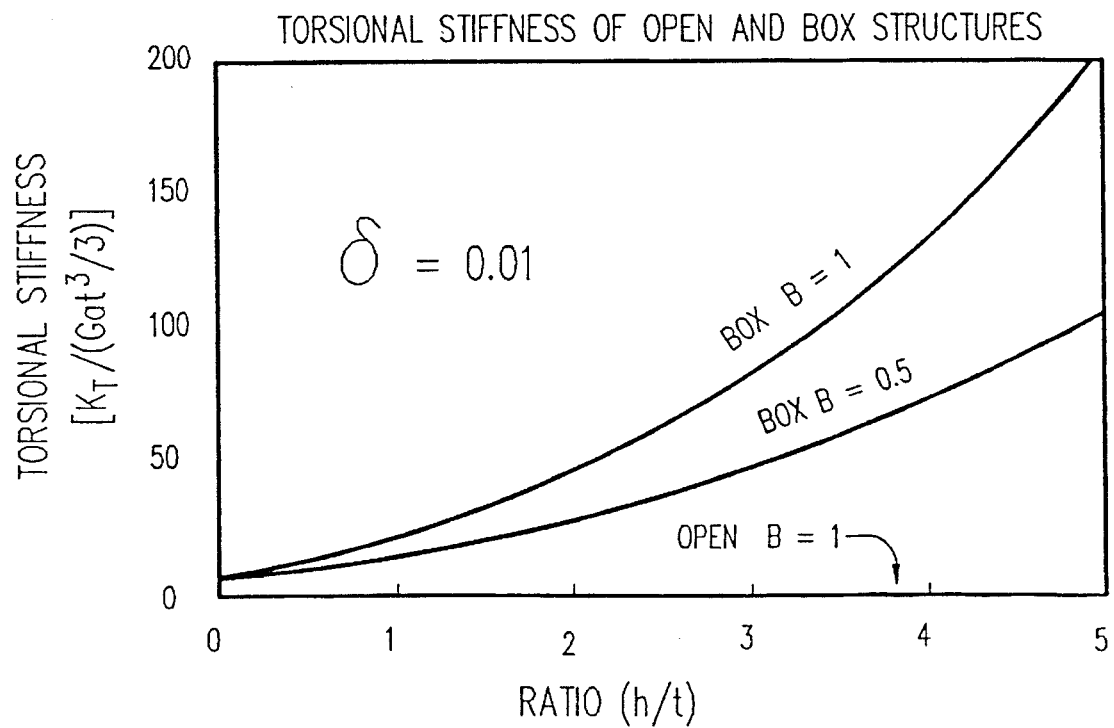
FIG. 11 is a graph of torsional rigidity versus the ratio (h/t)
Figure 13:
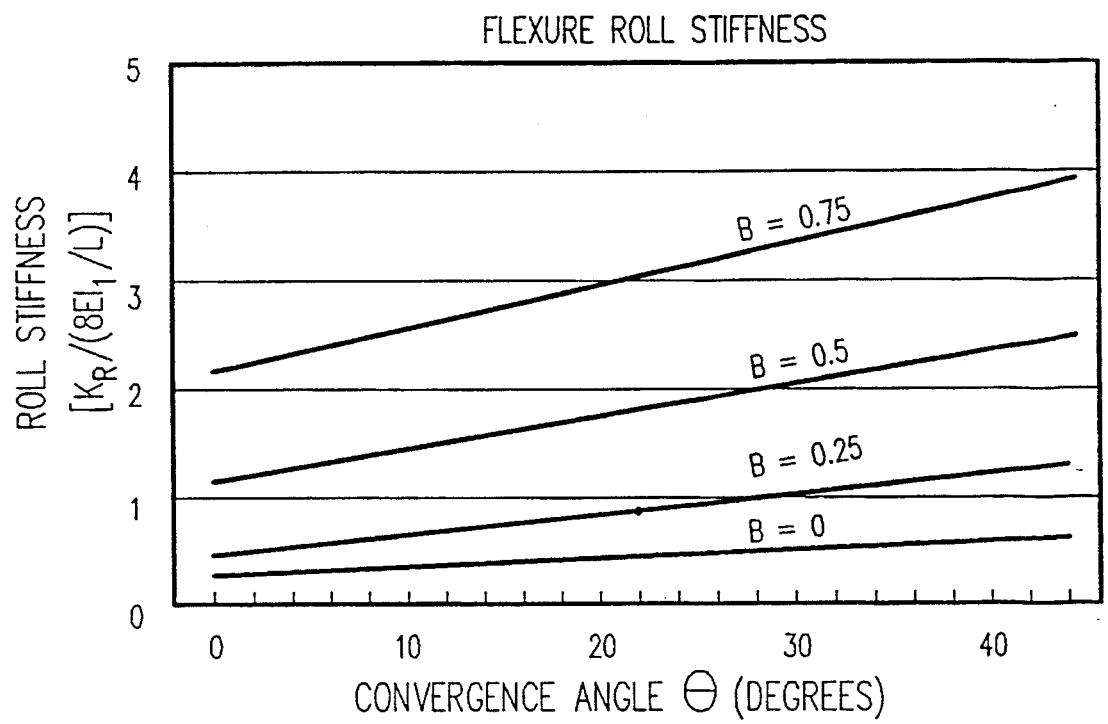
FIG. 13 is a graph of roll stiffness versus convergence angle.
Figure 14:
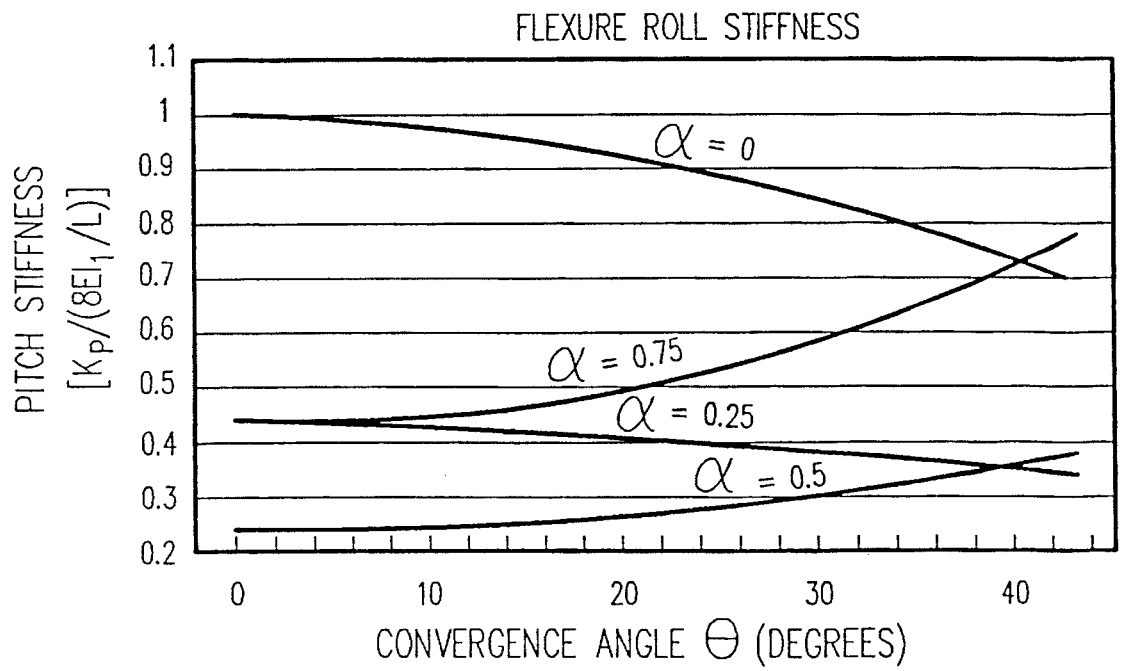
FIG. 14 is a graph of pitch stiffness versus convergence angle.
Figure 15:
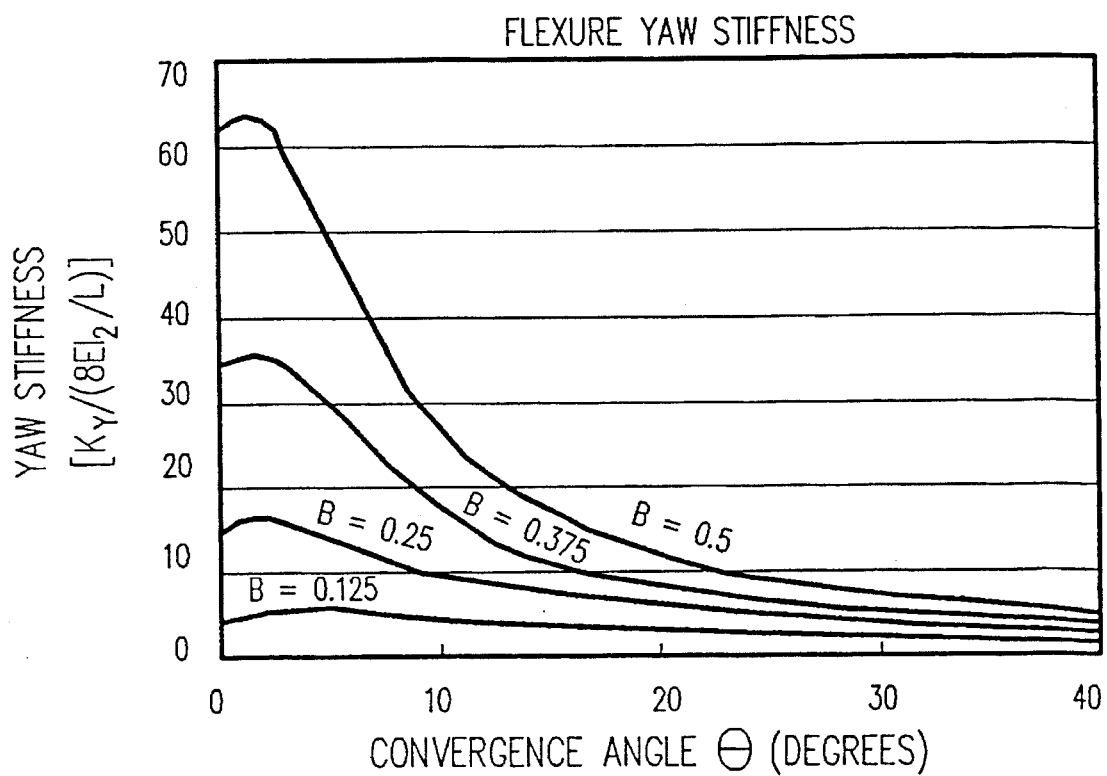
FIG. 15 is a graph of yaw stiffness versus convergence angle.
Figure 16:
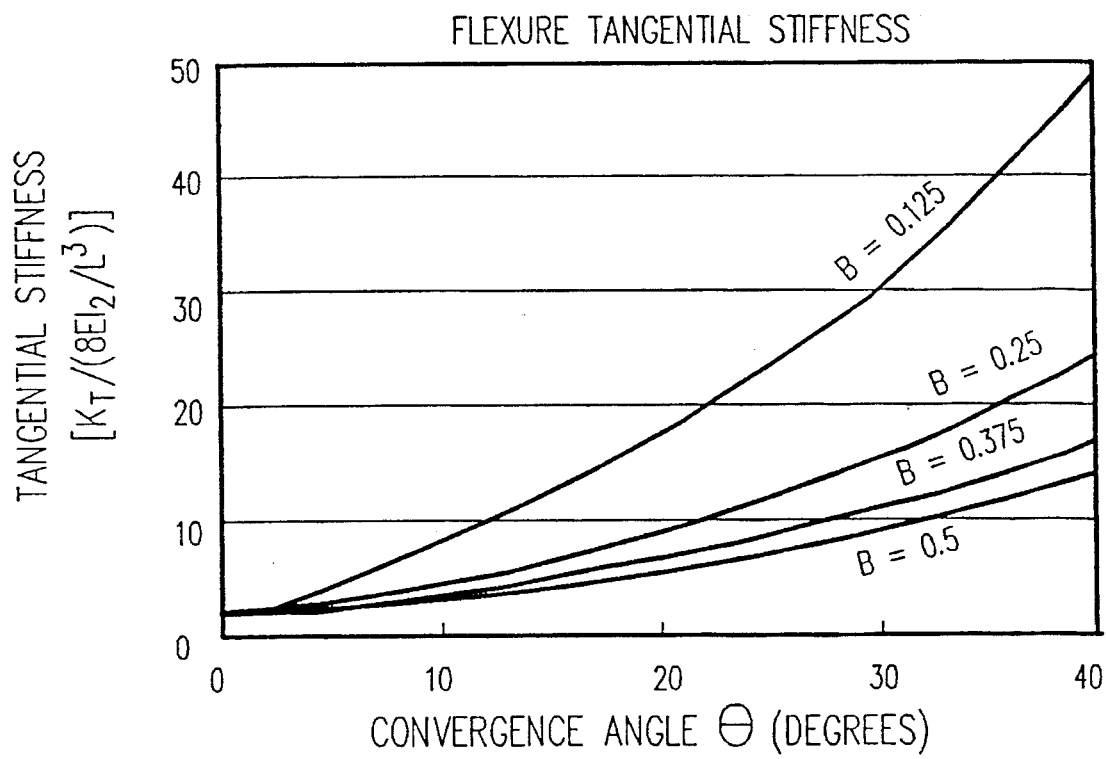
FIG. 16 is a graph of tangential stiffness versus convergence angle.

FIG. 11 shows a graph of torsional stiffness vs. (h/t) for box and open structures. The units of stiffness have been normalized. It can be seen that the box structure has from five to two hundred times more torsional rigidity than an open structure of similar size.

Flexure 104 is made of a thin rigid material, such as stainless steel, and is of a thickness in the range of 0.02 mm to 0.03 mm, and preferably 0.025 mm. The flexure 104 is flat and unformed and is substantially triangular in shape. Flexure 104 has a tooling aperture 200 which corresponds to tooling apertures 164 and 190. Flexure 104 has a tongue section 202 which is substantially similar in size and shape to the forward portion of the rigid section 160 of load beam 102. Tongue 202 is surrounded by an aperture 204. Aperture 204 is comprised of a pair of slot sections 206 and one gap section 208. Slot sections 206 separate tongue section 202 from a pair of flexure legs 210. A tab section 212 is connected to the ends of legs 210 and is separated from tongue 202 by gap section 208. Flexure 104 is spot welded to the top surface of rigid section 160 of beam 102. Legs 210 are sized such that they extend freely beyond the sides of load beam 102. Legs 210 have a bend or knee 214 about halfway along their length. Gap section 208 is sized such that the dimple 170 of beam 102 remains uncovered. Capture tabs 172 of beam 102 are sized to extend below legs 210.

Spacer member 108 is spot welded to the bottom side of tab section 212 of flexure 104. Spacer member 108 has a shape substantially similar to tab 212. Member 108 has a finger tab 220, a wiring tab 221, and a concave edge 222. Concave edge 222 is sized to provide clearance for the tip 168 of beam 102. Spacer member 108 is made of a thin rigid material, such as stainless steel, and is preferably substantially the same thickness as the material of load beam 102.

Slider plate member 110 is shaped substantially similar to spacer 108. Member 110 has finger tabs 230. Member 110 also has a dimple tongue 232 which is shaped to extend below and contact dimple 170 of beam 102. In an alternative embodiment, dimple 170 may be formed in slider plate member 110 and project upward to contact the tip of load beam 102 which no longer has a dimple. Member 110 is spot welded to spacer 108. Slider 120 is cemented to member 110 by an appropriate adhesive such as cyanoacrylate. Slider 120 is connected to plate 110 such that dimple 170 is positioned over the center of gravity of slider 120. Slider 120 is made of a wear resistant material and is preferably made of ceramic.

The centerline of the flexure legs are spaced further apart at the base, where the flexure is connected to the load beam and closer together where the legs are joined to the tab section 212. The width of the legs are wider at the base and narrower at the tab. Furthermore, the centerlines of the legs are not straight lines, but have bend 214 where the angle changes such that each centerline forms a convex curve or polygram with respect to the longitudinal centerline of the suspension.

Figure 12:
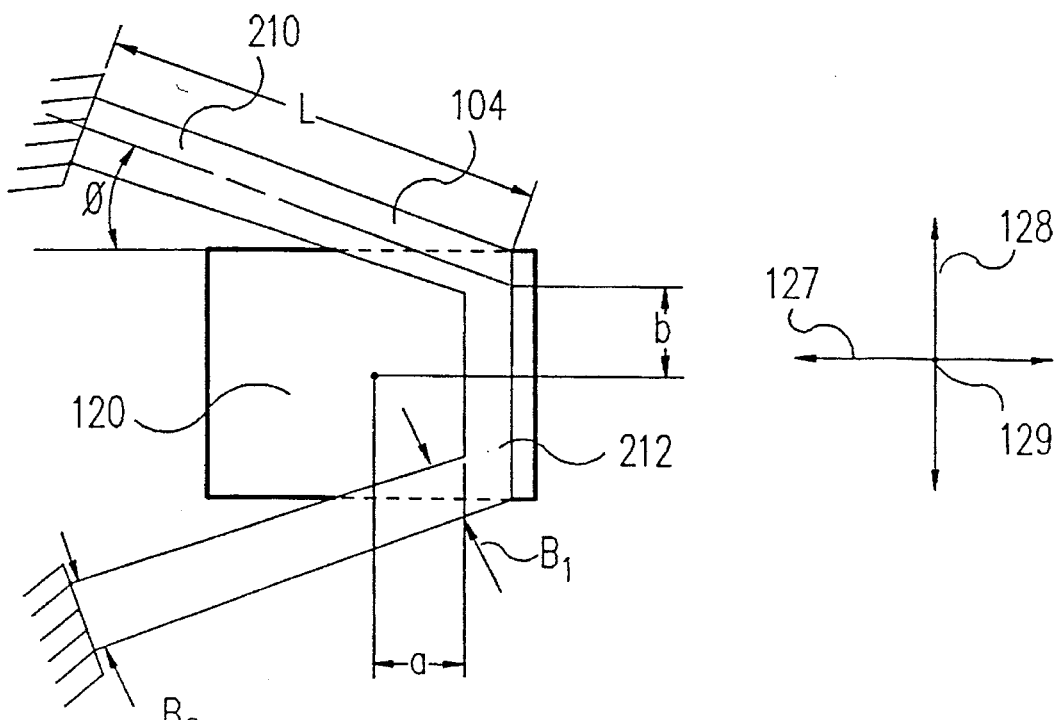
FIG. 12 is a schematic diagram of a top view of the flexure of the present invention.

FIG. 12 shows a schematic diagram of the legs 210 and slider 120, where L is the length of the legs 210, $B_1$ is the width of the legs 210 near tab 212, $B_2$ is the width of legs 210 near where they connect to the rest of flexure 104, and $d=[(B_1+B_2)/2]$ is the average width of legs 210, e is the angle of convergence of the legs 210, and a and b represent the distances from the center of gravity of the slider (dimple load point 170) to the end and sides, respectively of flexure legs 210. For the flexure 104 the following equations are given:

a) Roll Stiffness, $K_R$, (Bending about axis 127)

$$K_R = \frac{8EI_1}{L}\left(\sin^2\theta + 3\beta\sin\theta + 3\beta^2 + \frac{3}{8}\cos^2\theta\right)$$

b) Pitch Stiffness, $K_p$, (Bending about axis 128)

$$K_p = \frac{8EI_1}{L}\left(\cos^2\theta - 3\alpha\cos\theta + 3\alpha^2 + \frac{3}{8}\sin^2\theta\right)$$

c) Yaw Stiffness, $K_y$, (Bending about axis 129)

$$K_y = \frac{8EI_2}{L}\left(\frac{\sin^2\theta + 3\beta\sin\theta + 3\beta^2 + 3\rho^2\cos^2\theta}{\sin^2\theta + 12\rho^2\cos^2\theta}\right)$$

d) Tangential Stiffness, $K_T$ (Linear movement along axis 128)

$$K_T = \frac{8EI_2}{L^3}\left[\frac{\sin^2\theta + 3\beta\sin\theta + 3\beta^2 + 3\rho^2\cos^2\theta}{\beta^2(\cos^2\theta + 12\rho^2\sin^2\theta) + 12\rho^2\left(\beta\sin\theta + \frac{1}{3}\right)}\right]$$

where:

$$\alpha = \frac{a}{L} \quad \beta = \frac{b}{L}$$

$$I_1 = \frac{1}{12}dt^3 \quad I_2 = \frac{1}{12}d^3t$$

$$\rho^2 = \frac{1}{12}\left(\frac{d}{L}\right)^2$$

FIGS. 13, 14, 15, and 16 show graphs of roll, pitch, yaw and tangential stiffness versus convergence angle $\Theta$ for flexure 104. The units of stiffness have been normalized.

An advantage of tapering the widths of legs 210 is that the rotation of the slider 120 about axis 128 may be reduced. Ordinarily, the force from dimple 170 pressing on plate member 110 causes legs 210 to bend downward toward the slider 120 and causes slider 120 to rotate such that element 122 moves in a downward direction. This problem is increased by the need to position the slider 120 so that it extends beyond the edge of the assembly 32. It is desirable to keep slider 120 as close to horizontal as possible. The flexure 104 allows some relatively small pitch and roll to compensate for operating conditions, however, the slider 120 should initially be close to horizontal. By adjusting the taper of legs 210 it is possible to cancel or reduce rotation about axis 128. The following equation may be used where zero rotation is desired:

$$\frac{a}{L} = \frac{1}{1-\alpha}\left[\frac{\alpha\ln\alpha - \alpha + 1}{\ln\alpha}\right]$$

where, $$\alpha = \frac{B_1}{B_2}$$

Figure 17:
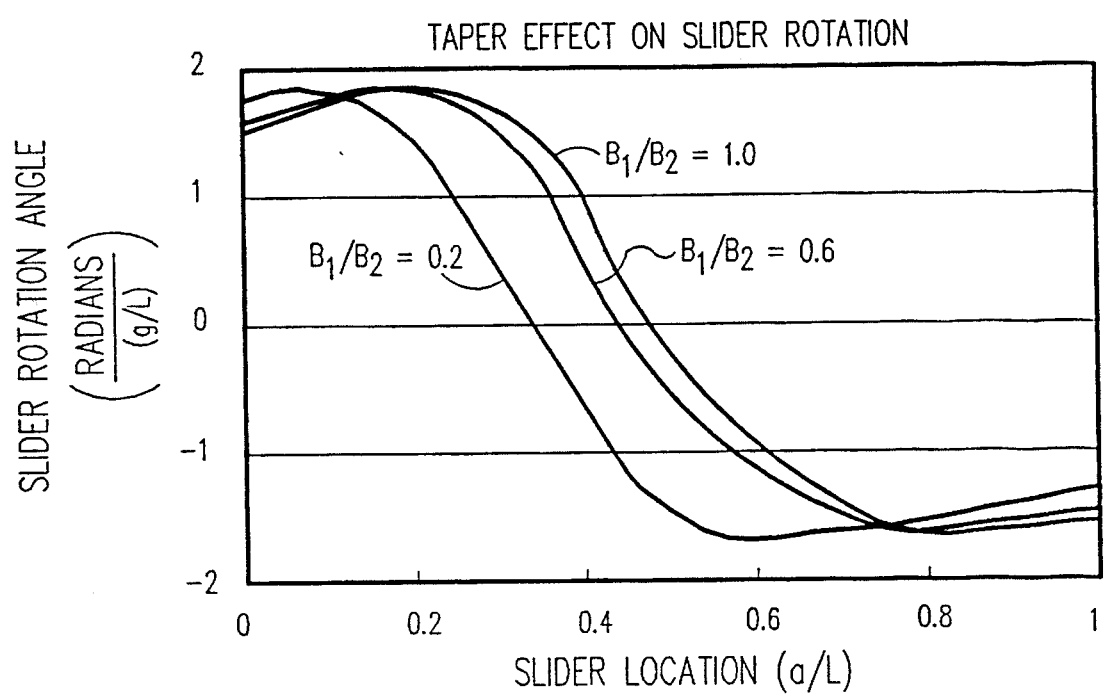
FIG. 17 is a graph of rotation angle versus the ratio (a/L)

FIG. 17 shows a graph of slider rotation angle versus the slider location (a/L) for three different tapers ($B_1/B_2$). The units of angle have been normalized by g/L, where g is the height of the dimple 170. It can be seen that the taper of legs 210 helps reduce any unwanted rotation.

In the preferred embodiment the centerlines of the flexure legs are spaced apart 2.9 mm at the base, 2.5 mm at the knee and 0.8 mm at the tab section. The flexure leg widths are 0.55 mm at the base, 0.4 mm at the knee and 0.3 mm at the tab section. The length of the flexure legs is 3.5 mm and $\Theta=9$ degrees from the base of the legs to the knee and Θ=22 degrees from the knee to the tab section 212. These dimensions give a pitch stiffness of 0.12N-mm/radian and a roll stiffness of 0.12N-mm/radian with the wires attached. The angle of the flexure legs and the tapered width and length were optimized to increase the lateral stiffness to 35N/mm while keeping pitch and roll stiffnesses low.

Figure 18:
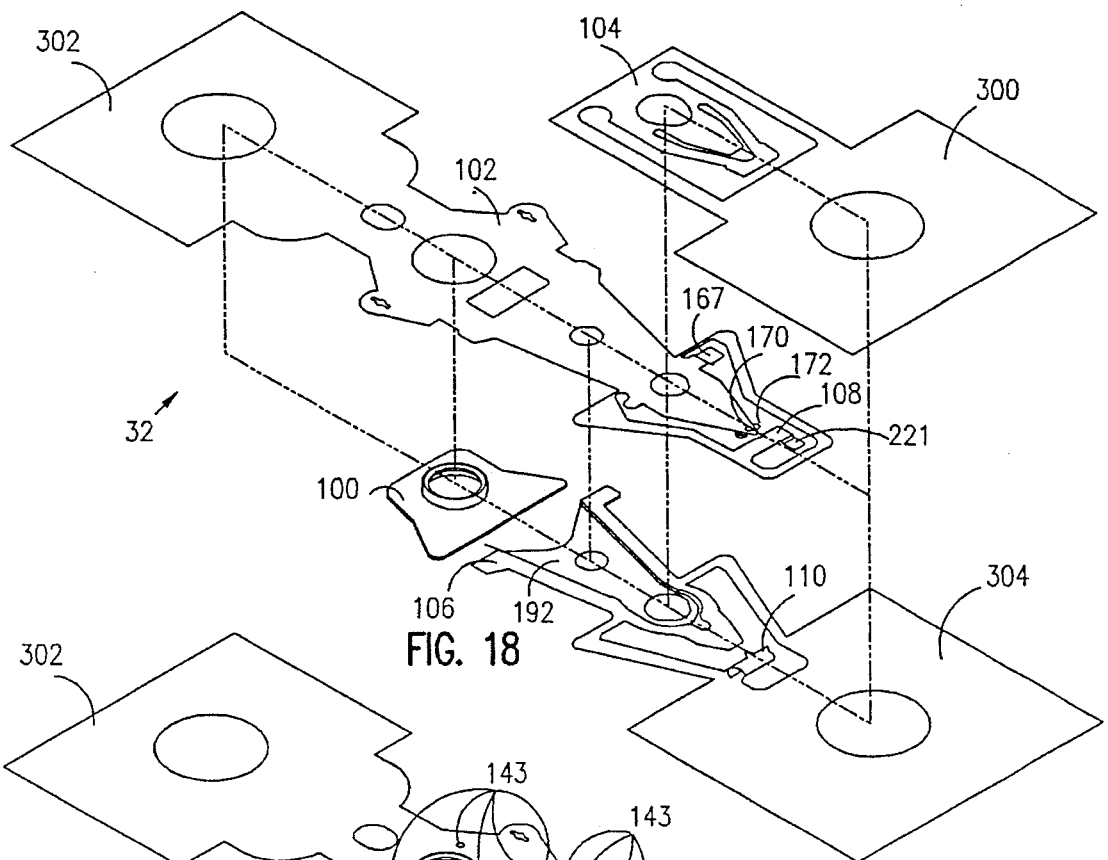
FIG. 18 is an exploded view which shows the manufacture of the suspension of the present invention.
Figure 19:
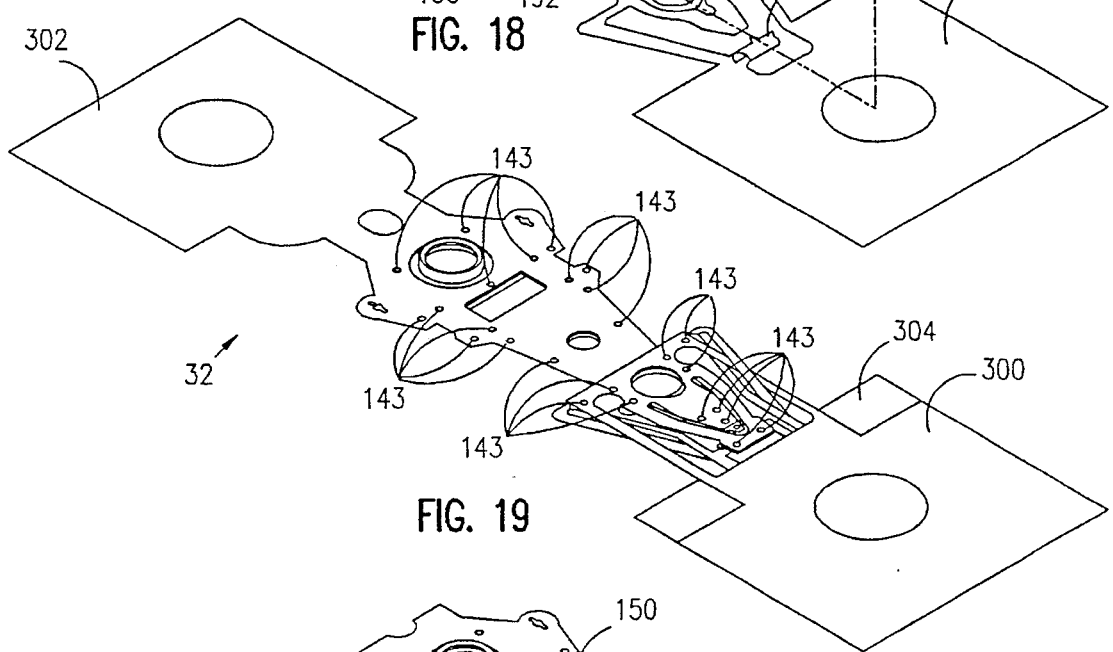
FIG. 19 is a perspective view which shows the manufacture of the suspension system of the present invention.
Figure 20:
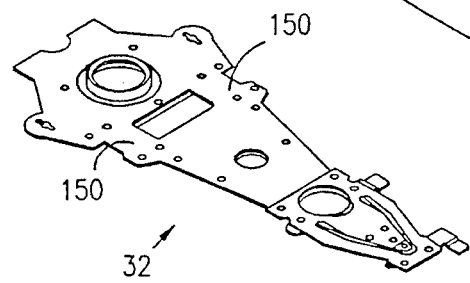
FIG. 20 is a perspective view which shows the manufacture of the suspension system of the present invention.

FIGS. 18, 19 and 20 show the manufacture of the suspension 32 of the present invention. FIG. 18 shows an exploded view of mounting block 100, a sheet 300, a sheet 302, and a sheet 304. Sheets 300, 302 and 304 are thin sheets of stainless steel which are etched to form the desired parts. Sheet 300 contains the flexure 104. Sheet 302 contains the load beam 102 and spacer 108. Sheet 304 contains the stiffener member 106 and the slider plate member 110. It can be seen, that load beam 102 and spacer 108 are the same thickness, as are stiffener member 106 and slider plate member 110.

After etching, sheet 302 is stamped in order to form the lower elevation portions of wiring tabs 167 and 221, capture tabs 172 and dimple 170. Sheet 304 is stamped to form the chamber 192 of the stiffener member 106. The parts are then stacked and positioned as shown in FIG. 19. The parts are spot welded together at welds 143. Next, the excess material of the sheets 300, 302 and 304 is cut away as shown in FIG. 20. The spring portion 150 is then bent slightly downward to the desired angle needed to position the slider 120 over the disk. Next, the slider 120 and the wiring are attached. In the preferred embodiment the slider 120 has a thickness of 0.425 mm.

Figure 21:
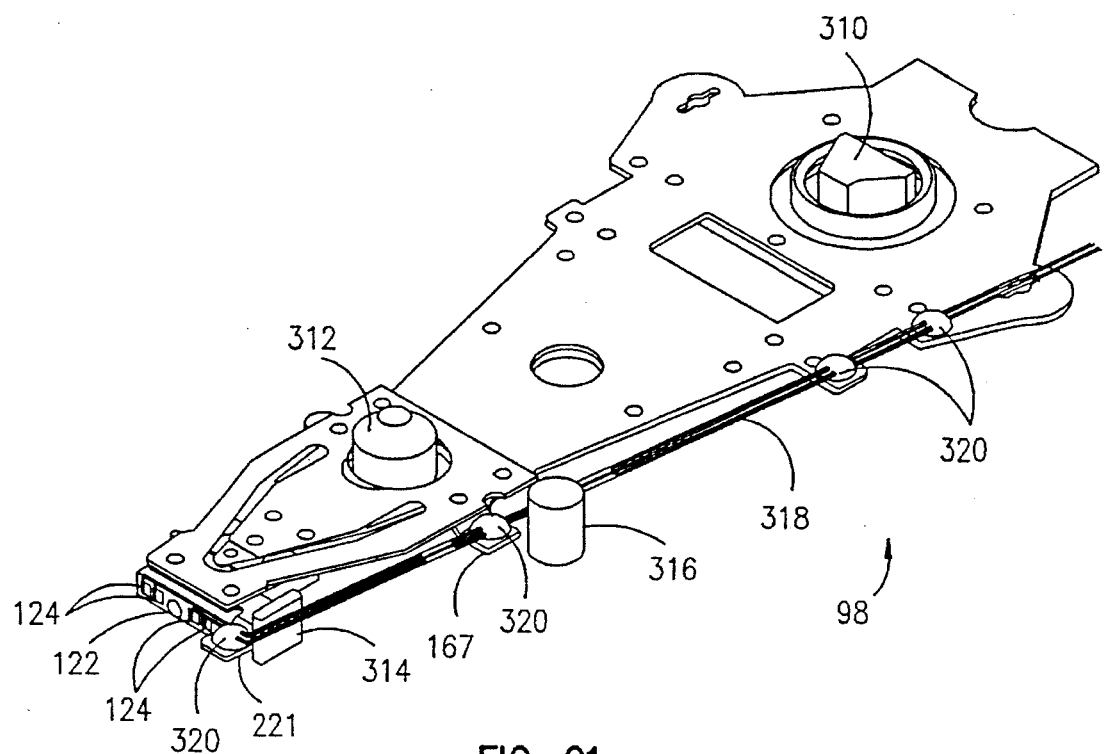
FIG. 21 is a perspective view of the suspension system of FIG. 7 which shows the process for attaching wiring.

FIG. 21 shows a perspective view of the assembly 98 when placed in a tooling jig. A tooling jig comprises pegs 310, 312, 314 and 316. The peg 310 passes through apertures 130 of block 100 and aperture 142 of beam 102. Peg 312 passes through apertures 190, 164 and 200 of stiffener 106, beam 102 and flexure 104, respectively. The pegs 310 and 312 are used to keep the individual parts in proper alignment during manufacture of assembly 98. A final step in the manufacture of assembly 98 is the addition of wiring leads 318. Wiring leads 318 connect the electrical pads 124 of head 30 to the read/write channel 58. The leads 318 are ultrasonically bonded to the pads 124 of head 30. Leads 318 are then attached to assembly 98 by adhesive drops 320 as described in U.S. Pat. No. 5,074,029. Suitable adhesives include ultraviolet curing adhesives. The leads 318 are attached to wiring tabs 221 and 167. The pegs 314 and 316 are used to properly position the leads 318 during attachment. The leads 318 are then passed on to the read/write channel 58. The side to which the leads 318 are routed on assembly 98 is determined by the orientation of the assembly 98 in the disk stack. The leads 318 are preferably routed to the side of assembly 98 furthest away from the spindle 14.

Figure 22:
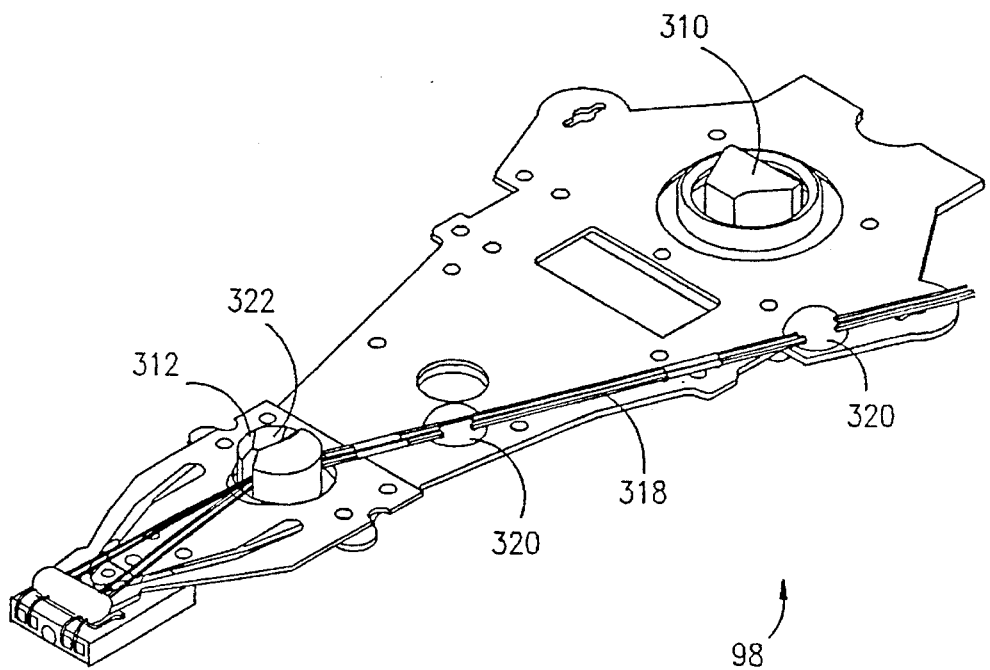
FIG. 22 is a perspective view of an alternative embodiment of the suspension system.

FIG. 22 shows a perspective view of the assembly 98 using an alternative wiring scheme. The leads 318 are routed over the top of the suspension. Peg 312 has a slot 322 for aligning the leads 318 during attachment.

Figure 23:
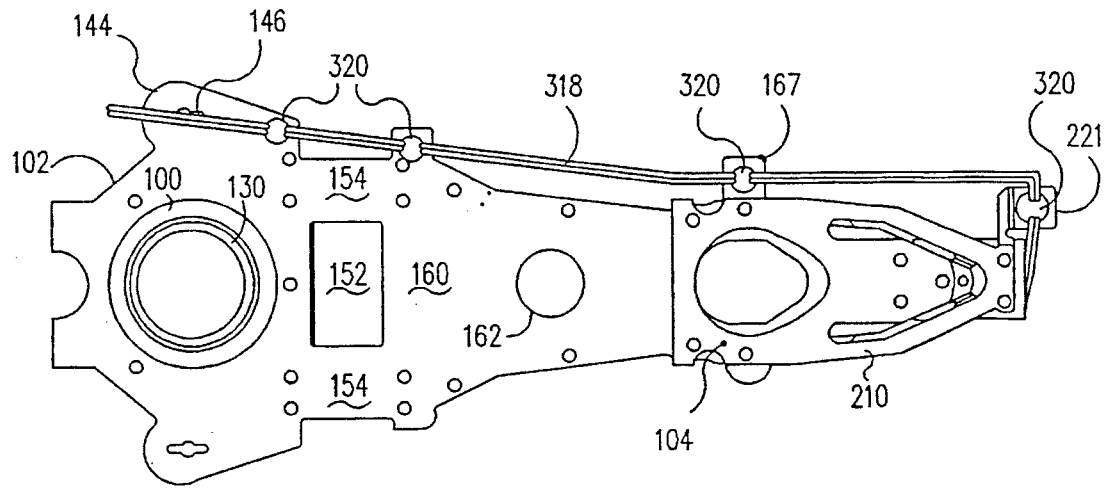
FIG. 23 is a top view of the suspension system of FIG. 21.
Figure 24:
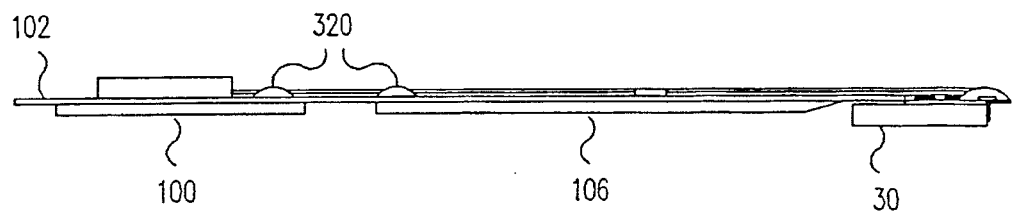
FIG. 24 is a side view of the suspension system of FIG. 21.
Figure 25:
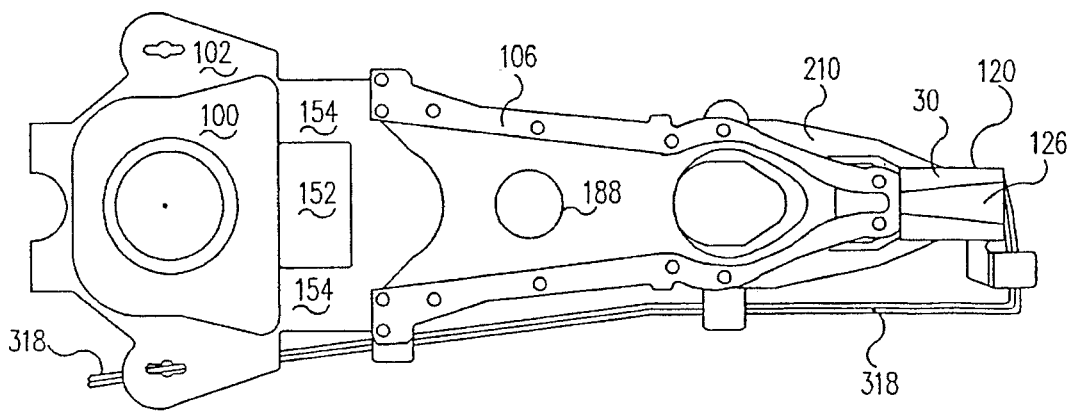
FIG. 25 is a bottom view of the suspension system of FIG. 21.

FIGS. 23, 24, and 25 show a top, side, and bottom view, respectively, of the completed assembly 98 including leads 318.

Figure 26:
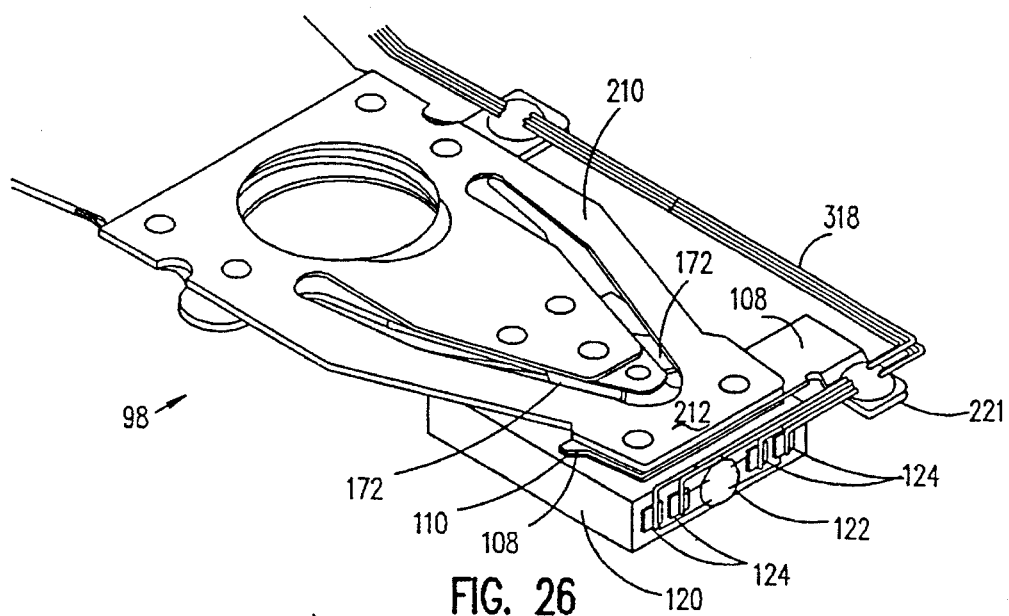
FIG. 26 is a detailed perspective view of the head area of the suspension system of the present invention.
Figure 27:
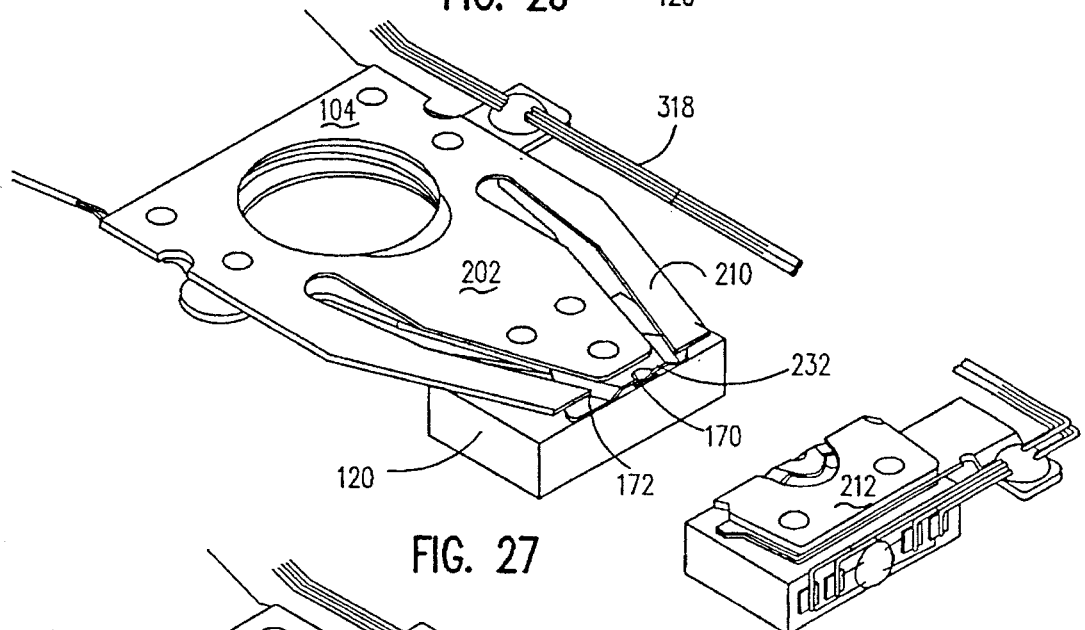
FIG. 27 is a first cross sectional view of the system of FIG. 26.
Figure 28:
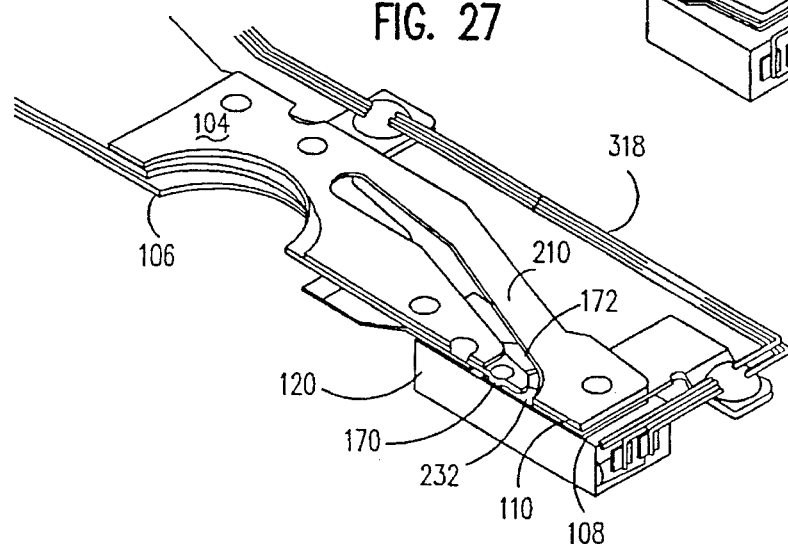
FIG. 28 is a second cross sectional view of the system of FIG. 26.

FIG. 26 shows a perspective view of the head portion of assembly 98. FIGS. 27 and 28 show two different cross sectional views of the portion of FIG. 26. Note that the dimple 170 makes a point contact with the tongue 232 of plate 110. This allows slider 120 to pitch (rotate about the latitudinal axis 128) and roll (rotate about the longitudinal axis 127). To achieve this movement, legs 210 bend in the vertical direction 129. It can be seen that capture tabs 172 limit the bending of legs 210 in a downward direction. This limitation protects the assembly 98 and especially the wiring leads 318 from shock damage during assembly and whenever the head 30 is unloaded from the disk surface. This limitation is essential in the alternate wiring scheme shown in FIG. 22. Note also that the height of dimple 170 must be selected carefully to position capture tabs 172 in the center of the vertical clearance between the slider 120 and flexure legs 210. The dimple height is selected large enough to create clearance between the slider 120 and the tip of stiffener ledge 180 which is proximate load beam tip 168. During operation the tip of the load beam, stiffener and flexure directly over the slider deflects due to the load transmitted to the air bearing through dimple 170. Thus, the clearance must be large enough to allow for this bending deflection and allow for pitch (rotation about latitudinal axis 128) and roll (rotation about longitudinal axis 127) excursions of the slider. The dimple height cannot be selected too large, however, since the dimple height directly adds to the profile height of the suspension assembly through the slider and limits how close the disks can be spaced. In the preferred embodiment an optimal dimple height has been found to be 0.05 mm.

The solid height of the slider 120, slider mounting plate 110, dimple 170, load beam tip 168 and flexure 104 in the preferred embodiment is 0.583 mm. The preferred side routing of the wires is contained within this height, such that the wires do not reduce the ability to merge the suspension systems in the smallest possible disk to disk spacing of about 1.5 mm as shown in FIG. 5 allowing 0.17 mm per suspension unload clearance. If the smallest disk to disk spacing is not required, the alternate wiring shown in FIG. 22 may be used with a disk to disk spacing of 1.8 mm or greater.

The operation of the present invention may now be understood. Initially, the head/suspension assembly 98 is parked off of disks 12 on ledge 84 of ramp member 80. This is the unloaded condition. Spindle motor 16 rotates the disks 12. When it is desired to read or write data from one of the disks 12, controller unit 50 causes actuator motor 36 to move assembly 98 inward towards the disks 12. As this happens, the assemblies 98 slide down the ramps 82 until they are positioned proximate a surface of one of the disks 12. The data is then recorded or read from a data track of one of the disks 12.

The rotation of disks 12 causes an air bearing to be formed at air bearing surface 126 of slider 120. This causes the slider 120 to float above the surface of the disks 12. Spring section 150 of load beam 102 exerts a force to bring the slider 120 towards the surface of the disks 12 such that the proper fly height is maintained.

The assembly 98 maintains a rigid structure between the spring section 150 and the head 30. This is achieved in a very low profile by the use of the stiffener member 106 and beam 102. The assembly 98 also provides a low profile pivoting assembly for the slider 120. This is accomplished by a series of thin stacked members. This allows precise manufacture of the pivoting assembly even at very small dimensions. An additional feature of the pivoting assembly is the use of the capture tabs 172. These tabs 172 prevent the legs 210 from bending too far in the vertical direction. This limits the movement of the head 30 away from the tip 168 of beam 102 when the head is unloaded from the disk 12 and during manufacture of the suspension. This helps prevent the wire leads 318 from becoming bent or damaged.

The present invention gives several manufacturing advantages compared with prior art suspensions. In the invention, the flexure is not formed to create a clearance between the flexure legs and the slider as is the case in prior art. Instead, the clearance is created by a stack of thin members as already described so arranged as to allow the flexure to be attached to the load beam from the side opposite the slider. In prior art the flexure is attached between the load beam and the slider. The arrangement of the present invention allows a "tops down" assembly method where the parts are handled in strips of multiple components. The capture tab feature is thus created without any interleaving of components prior to welding. Since the flexure goes onto the stack last and is unformed, there is no manufacturing variations of the clearance dimension or static pitch and roll angles. In prior art flexures, these dimensions have manufacturing variations due to the response of the material thickness and yield strength in the forming dies used to create the offset clearance of the flexure legs to the slider. Thus in the present invention flexure thickness can be varied by design to allow multiple products to be manufactured without affecting any forming dies and without the normal variation of dimensions usually experienced in forming flexures. Different thickness flexures can be used for different size sliders or different size air bearings with their unique stiffness requirements.

Resonance modes which produce lateral motion of the slider along axis 128 are undesirable because they limit the performance of the actuator. Such modes include torsion and lateral sway modes. Prior art flanged open structure suspensions tend to have some of these modes below 3000 Hz. For the same size suspension, the boxed structure of the present invention will have higher resonance frequencies.

Figure 29:
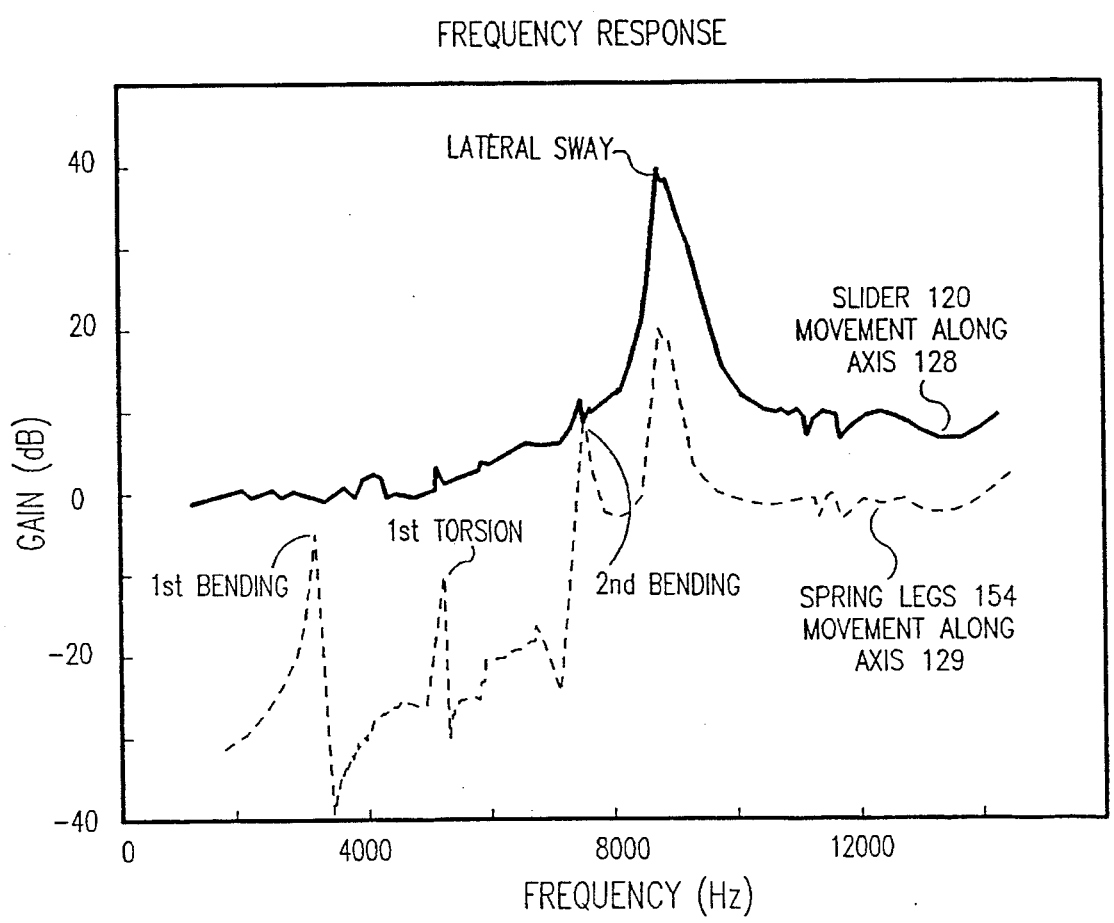
FIG. 29 is a graph of gain versus frequency.

FIG. 29 shows a graph of gain versus frequency at the spring legs 154 and slider 120 of the suspension. The suspension of the present invention has high frequency radial resonances with controllable gain. For the same size flanged open structure prior art suspensions the first torsion mode is about 2000–3000 Hz and it has a relatively higher gain. This compares with a first torsional mode of about 5000 Hz with about zero gain for the present invention. For this reason, prior art suspensions commonly require the addition of dampers at considerable additional cost, whereas the present invention suspension does not require dampers. The measurement in FIG. 29 was performed on a shaker where the shaker mass is very high when compared to an actual disk drive actuator, the gain when mounted on the actuator would be much lower.

The box section also results in a very low and smooth side profile, compared to conventional side flanged suspension of prior art. This small side area and smoother surfaces result in smaller excitations of the suspension due to air flow turbulence and results in smaller off-track errors due to the air flow in the disk drive system.

The overall result of the present invention is a low profile suspension which is ideally suited for use with smaller sized heads. The low profile enables the disks to be spaced closer together thereby allowing a disk drive system to have more disks in order to increase the data storage capacity or to have the same capacity in a smaller package height.

In an alternate embodiment, flexure 104 is not a separate piece, but is integral with load beam 102 and spacer member 108. Flexure legs 210 are connected to load beam 102 at finger tabs 166 and to spacer member 108.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A suspension system comprising:

a load beam having a longitudinal axis, a lateral axis and a perpendicular axis, a first and a second end of the load beam being located along the longitudinal axis, the first end for connection to a support member, the load beam having a first and a second surface each aligned substantially parallel to a plane containing the longitudinal and lateral axes;

a stiffener member connected to the load beam between the first and second ends of the load beam and located on the side of the load beam which contains the first surface of the load beam, the stiffener member and the load beam forming an enclosed interior chamber along a cross sectional plane parallel to a plane containing the lateral and perpendicular axes;

a flexible member having a first and second surfaces, the flexible member having a first portion which is connected to the second end of the load beam at the first surface of the flexible member, the first portion overlying the second surface of the load beam, the flexible member having a second portion having a first and a second flexure leg members which extend beyond the edge of the second end of the load beam, the second end of the load beam is located between the first and second flexure leg members; and a transducer assembly mounting member comprising a first plate member and a second plate member, the first plate member underlying and connected to the first surface of the flexible member at the second portion of the flexible member, the second plate member underlying and connected to the first plate member, the first plate member further comprising an extension tab for supporting transducer lead wires, the transducer assembly mounting member for receiving a transducer assembly such that the transducer assembly is on the same side of the flexible member as the load beam and the transducer assembly and the stiffener member are both located in a plane parallel to a plane containing the longitudinal and lateral axes.

2. The system of claim 1, wherein the load beam has a spring section located between the stiffener member and the support member.

3. The system of claim 1, wherein the load beam has a pair of spring legs surrounding an aperture located between the stiffener member and the support member.

4. The system of claims 1, wherein the stiffener member forms at least three sides of the enclosed interior chamber.

5. The system of claim 1, wherein the stiffener member comprises a bottom section, a sidewall section connected to the bottom section, and a ledge section connected to the sidewall section.

6. The system of claim 1, wherein the second plate member has an extension portion that engages a contact point on a distal portion of the second end of the load beam.

7. The system of claim 1, further comprising a transducer assembly connected to the mounting member.

8. The system of claim 7, wherein the transducer assembly comprises a fluid bearing slider and a transducer.

9. The system of claim 1, wherein the first plate member has a thickness substantially equal to the thickness of the material of the load beam.

10. The system of claim 1, wherein the second plate member has a thickness substantially equal to the thickness of the material of the stiffener member.

11. A suspension system comprising:

a load beam having a longitudinal axis, a lateral axis, and a perpendicular axis, a first and a second end of the load beam being located along the longitudinal axis, the first end for connection to a support member, the load beam having a first surface and a second surface each aligned substantially parallel to a plane containing the longitudinal and lateral axes, the load beam having a load beam contact point on the first surface proximate the second end;

a stiffener member connected to the load beam between the first and second ends of the load beam and located on the side of the load beam which contains the first surface of the load beam, the stiffener member and the load beam forming an enclosed interior chamber along a cross sectional plane parallel to a plane containing the lateral and perpendicular axes;

a flexure member having a first and second surfaces, the flexure member having a first portion connected to the second end of the load beam at the first surface of the flexure member, the first portion overlying the second surface of the load beam, the flexure member having a second portion having a first and a second flexure leg members which extend beyond the edge of the second end of the load beam, the second end of the load beam is located between the first and second flexure leg members, the second portion of the flexure member having a tab section connecting the first and second leg members at an end of each of the first and second leg members; and a transducer assembly mounting member comprising a first plate member and a second plate member, the first plate member having an extension tab for supporting transducer lead wires, the first plate member underlying and connected to the tab section of the first surface of the flexure member on the same side of the flexure member as the load beam, the second plate member underlying and connected to the first plate member, and further comprising an extension portion which engages the load beam contact point, the transducer assembly mounting member for receiving a transducer assembly such that the transducer assembly is on the same side of the flexure member as the load beam and the transducer assembly and the stiffener member are both located in a plane parallel to a plane containing the longitudinal and lateral axes.

12. The system of claim 11, wherein the load beam has a spring section located between the stiffener member and the support member.

13. The system of claim 11, wherein the load beam has a pair of spring legs surrounding an aperture located between the stiffener member and the support member.

14. The system of claim 11, wherein the stiffener member forms at least three sides of the enclosed interior chamber.

15. The system of claim 11, wherein the stiffener member comprises a bottom section, a sidewall section connected to the bottom section, and a ledge section connected to the sidewall section and in contact with the load beam first surface.

16. The system of claim 11, wherein the extension portion has a mounting member contact point which engages the load beam contact point.

17. The system of claim 16, wherein the first plate member has a thickness substantially equal to the thickness of the material of the stiffener member.

18. The system of claim 16, wherein the second plate member has a thickness substantially equal to the thickness of the material of the stiffener member.

19. The system of claim 11, further comprising a transducer assembly connected to the mounting member.

20. The system of claim 19, wherein the transducer assembly comprises a fluid bearing slider and a transducer.

21. The system of claim 20, wherein the center of gravity of the slider is located along a line parallel to the perpendicular axis from a mounting member contact point of the extension portion.

22. The system of claim 20, wherein the interior chamber terminates prior to the location of the slider along a direction parallel to the longitudinal axis.

23. The system of claim 11, wherein the flexure leg members each have a center line which converge at a first angle with respect to one another at the tab section.

24. The system of claim 11, wherein the flexure leg members each have a bend in their center lines which divide each flexure leg member into a first and second portion, such that the center lines of the first portions in a direction towards the tab section converge at a first angle, and the center lines of the second portions in a direction towards the tab section converge at a second angle.

25. The system of claim 11, wherein the flexure leg members gradually taper in width along their entire lengths from proximate the load beam to proximate the tab section.

26. The system of claim 11, wherein the load beam contact point comprises a dimple.

27. The system of claim 11, wherein the load beam further comprises at least one extending section which extends a distance along a direction parallel to the perpendicular axis below one of the flexure legs.

28. The system of claim 27, wherein the extending section is at a different elevation than the elevation of the rest of the load beam along a direction parallel to the perpendicular axis.

29. The system of claim 11, wherein the flexure member has a tongue section located between the first and second leg members, the tongue section overlying the load beam at the second end.

30. The system of claim 11, wherein the stiffener member terminates prior to the contact point of the load beam along a direction parallel to the longitudinal axis.

31. A disk drive comprising: a suspension system including, a load beam having a longitudinal axis, a lateral axis and a perpendicular axis, a first and a second end of the load beam being located along the longitudinal axis, the first end for connection to a support member, the load beam having a first and a second surface each aligned substantially parallel to a plane containing the longitudinal and lateral axes;

a stiffener member connected to the load beam between the first and second ends of the load beam and located on the side of the load beam which contains the first surface of the load beam, the stiffener member and the load beam forming an enclosed interior chamber along a cross sectional plane parallel to a plane containing the lateral and perpendicular axes;

a flexible member having a first and second surfaces, the flexible member having a first portion which is connected to the second end of the load beam at the first surface of the flexible member, the first portion overlying the second surface of the load beam, the flexible member having a second portion having a first and a second flexure leg members which extend beyond the edge of the second end of the load beam, the second end of the load beam is located between the first and second flexure leg members;

a transducer assembly mounting member comprising a first plate member and a second plate member, the first plate member having an extension tab for supporting transducer lead wires, the first plate member underlying and connected to the first surface of the flexible member at the second portion of the flexible member, the second plate member underlying and connected to the first plate member and further comprising an extension portion which engages a contact point on a distal portion of the second end of the load beam, the transducer assembly mounting member for receiving a transducer assembly such that the transducer assembly is on the same side of the flexible member as the load beam and the transducer assembly and the stiffener member are both located in a plane parallel to a plane containing the longitudinal and lateral axes;

a transducer assembly connected to the transducer assembly mounting member;

a data storage disk located proximate to the transducer assembly;

a rotation device connected to the disk for rotating the disk; and a movement device connected to the first end of the load beam for moving the transducer assembly relative to the disk.

32. The disk drive of claim 31, wherein the load beam has a spring section located between the stiffener member and the support member.

33. The disk drive of claim 31, wherein the load beam has a pair of spring legs surrounding an aperture located between the stiffener member and the support member.

34. The disk drive of claim 31, wherein the stiffener member forms at least three sides of the enclosed interior chamber.

35. The disk drive of claim 31, wherein the stiffener member comprises a bottom section, a sidewall section connected to the bottom section, and a ledge section connected to the sidewall section.

36. The disk drive of claim 31, wherein the transducer assembly comprises a fluid bearing slider and a transducer.

37. The disk drive of claim 31 wherein the second plate member has a thickness substantially equal to the thickness of the material of the load beam.

38. The disk drive of claim 31 wherein the second plate member has a thickness substantially equal to the thickness of the stiffener member.

39. A disk drive comprising: a suspension system including, a load beam having a longitudinal axis, a lateral axis, and a perpendicular axis, a first and a second end of the load beam being located along the longitudinal axis, the first end for connection to a support member, the load beam having a first surface and a second surface each aligned substantially parallel to a plane containing the longitudinal and lateral axes, the load beam having a load beam contact point on the first surface proximate the second end;

a stiffener member connected to the load beam between the first and second ends of the load beam and located on the side of the load beam which contains the first surface of the load beam, the stiffener member and the load beam forming an enclosed interior chamber along a cross sectional plane parallel to a plane containing the lateral and perpendicular axes;

a flexure member having a first and second surfaces, the flexure member having a first portion connected to the second end of the load beam at the first surface of the flexure member, the first portion overlying the second surface of the load beam, the flexure member having a second portion having a first and a second flexure leg members which extend beyond the edge of the second end of the load beam, the second end of the load beam is located between the first and second flexure leg members, the second portion of the flexure member having a tab section connecting the first and second leg members at an end of each of the first and second leg members;

a transducer assembly mounting member comprising a first plate member and a second plate member, the first plate member having an extension tab for supporting transducer lead wires, the first plate member underlying and connected to the tab section of the first surface of the flexure member on the same side of the flexure member as the load beam, the second plate member underlying and connected to the first plate member, and further comprising an extension portion which engages the load beam contact point, the transducer assembly mounting member for receiving a transducer assembly such that the transducer assembly is on the same side of the flexure member as the load beam and the transducer assembly and the stiffener member are both located in a plane parallel to a plane containing the longitudinal and lateral axes;

a transducer assembly connected to the transducer assembly mounting member;

a data storage disk located proximate to the transducer assembly;

a rotation device connected to the disk for rotating the disk; and a movement device connected to the first end of the load beam for moving the transducer assembly relative to the disk.

40. The disk drive of claim 39, wherein the load beam has a spring section located between the stiffener member and the support member.

41. The disk drive of claim 39, wherein the load beam has a pair of spring legs surrounding an aperture located between the stiffener member and the support member.

42. The disk drive of claim 39, wherein the stiffener member forms at least three sides of the enclosed interior chamber.

43. The disk drive of claim 39, wherein the stiffener member comprises a bottom section, a sidewall section connected to the bottom section, and a ledge section connected to the sidewall section and in contact with the load beam first surface.

44. The disk drive of claim 39, wherein the first plate member has a thickness substantially equal to the thickness of the material of the load beam.

45. The disk drive of claim 39, wherein the second plate member has a thickness substantially equal to the thickness of the stiffener member.

46. The disk drive of claim 39, wherein the transducer assembly comprises a fluid bearing slider and a transducer.

47. The disk drive of claim 46, wherein the center of gravity of the slider is located along a line parallel to the perpendicular axis from a mounting member contact point of the extension portion.

48. The disk drive of claim 46, wherein the interior chamber terminates prior to the location of the slider along a direction parallel to the longitudinal axis.

49. The disk drive of claim 39, wherein the flexure leg members each have a center line which converge at a first angle with respect to one another at the tab section.

50. The disk drive of claim 39, wherein the flexure leg members each have a bend in their center lines which divide each flexure leg member into a first and second portion, such that the center lines of the first portions in a direction towards the tab section converge at a first angle, and the center lines of the second portions in a direction towards the tab section converge at a second angle.

51. The disk drive of claim 39, wherein the flexure leg members gradually taper in width along their entire lengths from proximate the load beam to proximate the tab section.

52. The disk drive of claim 39, wherein the load beam contact point comprises a dimple.

53. The disk drive of claim 39, wherein the load beam further comprises at least one extending section which extends a distance along a direction parallel to the perpendicular axis below one of the flexure legs.

54. The disk drive of claim 53, wherein the extending section is at a different elevation than the elevation of the rest of the load beam along a direction parallel to the perpendicular axis.

55. The disk drive of claim 39, wherein the flexure member has a tongue section located between the first and second leg members, the tongue section overlying the load beam at the second end.

56. The disk drive of claim 39, wherein the stiffener member terminates prior to the contact point of the load beam along a direction parallel to the longitudinal axis.

* * * * *